(12) United States Patent
Song

(10) Patent No.: US 6,542,958 B1
(45) Date of Patent: *Apr. 1, 2003

(54) SOFTWARE CONTROL OF DRAM REFRESH TO REDUCE POWER CONSUMPTION IN A DATA PROCESSING SYSTEM

(75) Inventor: Seungyoon P. Song, Palo Alto, CA (US)

(73) Assignee: Elan Research, Mt. View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/566,901

(22) Filed: May 10, 2000

(51) Int. Cl.[7] ................................ G11C 7/00; G06F 12/02
(52) U.S. Cl. ............................ 711/106; 711/105; 365/222
(58) Field of Search ............................. 711/100, 104, 711/105, 106; 365/222; 713/330, 323, 324

(56) References Cited

U.S. PATENT DOCUMENTS

| | | | | |
|---|---|---|---|---|
| 5,396,635 A | * | 3/1995 | Fung .......................... | 713/323 |
| 5,758,175 A | * | 5/1998 | Fung .......................... | 713/323 |
| 5,764,582 A | * | 6/1998 | Tai ............................. | 365/222 |
| 5,781,782 A | * | 7/1998 | Tachikawa ................ | 713/330 |
| 5,828,619 A | * | 10/1998 | Hirano et al. ............ | 365/222 |
| 5,877,651 A | * | 3/1999 | Furutani .................... | 327/538 |
| 5,928,365 A | * | 7/1999 | Yoshida .................... | 713/330 |
| 5,966,725 A | * | 10/1999 | Tabo .......................... | 711/106 |
| 6,021,502 A | * | 2/2000 | Ando ......................... | 713/340 |
| 6,079,025 A | * | 6/2000 | Fung .......................... | 713/323 |
| 6,115,823 A | * | 9/2000 | Velasco et al. ............ | 713/322 |
| 6,167,484 A | * | 12/2000 | Boyer et al. ............... | 711/106 |

\* cited by examiner

*Primary Examiner*—Tuan V. Thai
(74) *Attorney, Agent, or Firm*—Sawyer Law Group LLP

(57) ABSTRACT

A method and system for controlling refresh of a plurality of dynamic random access memory (DRAM) cells in a data processing system is disclosed. The method and system comprises of providing at least one valid bit to control the refresh of at least one row of DRAM cells and providing a set of commands by a software program to control the at least one valid bit. Accordingly, a system and method in accordance with the present invention allows for software control of a DRAM refresh to reduce power consumption in a data processing system. In a system and method in accordance with the present invention, a plurality of valid bits are provided, each valid bit allows for a group of DRAM cells to suppress the refresh operation when a refresh is not needed. Each of the valid bits controls the refresh of all cells in a row of DRAM cells and all cells of a memory location are contained in one row. A system and method in accordance with the present invention utilizes a set of commands to set or clear a valid bit, which allows the software to control the refresh. The plurality of valid bits are preferably implemented using the DRAM cells but without providing a refresh mechanism.

27 Claims, 1 Drawing Sheet

SOFTWARE CONTROL OF DRAM REFRESH TO REDUCE POWER CONSUMPTION IN A DATA PROCESSING SYSTEM

FIELD OF THE INVENTION

The present invention relates generally to dynamic random access memories (DRAMs) and more particularly to reducing power consumption when utilizing such a memory.

BACKGROUND OF THE INVENTION

In computer systems where memory is shared among different programs, the OS (operating system) software decides which program gets to use which memory locations, generally consisting of eight bits (or a byte). The OS maintains a list of available memory locations, from which it selects the requested amount of memory locations to assign to the program making the request. The newly assigned memory locations are removed from the list of available memory locations. When a program is completed, the OS adds the memory locations that were used by the program to the list of available memory locations. If a system doesn't use an OS, then the application program or programs must collectively and cooperatively manage the sharing of the memory system.

In computer systems that provide an operating system, the application programs (all programs other than the OS) do not know of the physical locations of the memory that are assigned to them. This is achieved through a mechanism known as virtual memory system. The application programs specify a memory address known as virtual address, and the OS and the underlying hardware translates the virtual address to the corresponding physical address. In such systems, the application programs have no control over the physical memory system—only the OS has any and all control over the physical memory system.

To reduce the overhead of managing the memory system, a block of consecutive memory locations (or addresses) is treated as one unit, known as a page. The OS assigns one or more pages of memory locations to an application program. The size of a page can vary from system to system. One system may even support multiple page sizes. A common page size is 4K (4096) bytes.

Existing DRAM designs utilized in such computer systems require periodic refresh of all storage cells to prevent loss of data. Periodic refresh is needed even when DRAM is not being accessed for an extended period or when the data stored in DRAM is not valid.

In general, data in a memory location is deemed invalid until a program, which has exclusive access to the memory location for a period of time, has first written a known value to it. When a memory location is used by a program and is then released after the program is finished, the memory location is deemed to contain invalid information until it is re-assigned and is written a known value by another program. During this period, in which the memory location contains invalid data, existing DRAM chips refresh the memory location since they do not know that the memory location contains invalid data. Existing DRAM chips operate as if all cells in them always contain valid data. Accordingly, these cells are refreshed unnecessarily, thereby increasing power consumption of the overall system.

What is desirable is a mechanism for providing a DRAM refresh in a computer system only when needed rather than on regular basis. The system should be easy to implement, cost effective and adaptable to existing systems. The present invention addresses such a need.

SUMMARY OF THE INVENTION

A method and system for controlling refresh of a plurality of dynamic random access memory (DRAM) cells in a data processing system is disclosed. The method and system comprises of providing at least one valid bit to control the refresh of at least one row of DRAM cells and providing a set of commands by a software program to control the at least one valid bit.

Accordingly, a system and method in accordance with the present invention allows for software control of a DRAM refresh to reduce power consumption in a data processing system. In a system and method in accordance with the present invention, a plurality of valid bits are provided, each valid bit allows for a group of DRAM cells to suppress the refresh operation when a refresh is not needed. Each of the valid bits controls the refresh of all cells in a row of DRAM cells and all cells of a memory location are contained in one row. A system and method in accordance with the present invention utilizes a set of commands to set or clear a valid bit, which allows the software to control the refresh. The plurality of valid bits are preferably implemented using the DRAM cells but without providing a refresh mechanism.

DETAILED DESCRIPTION

Figure 1:
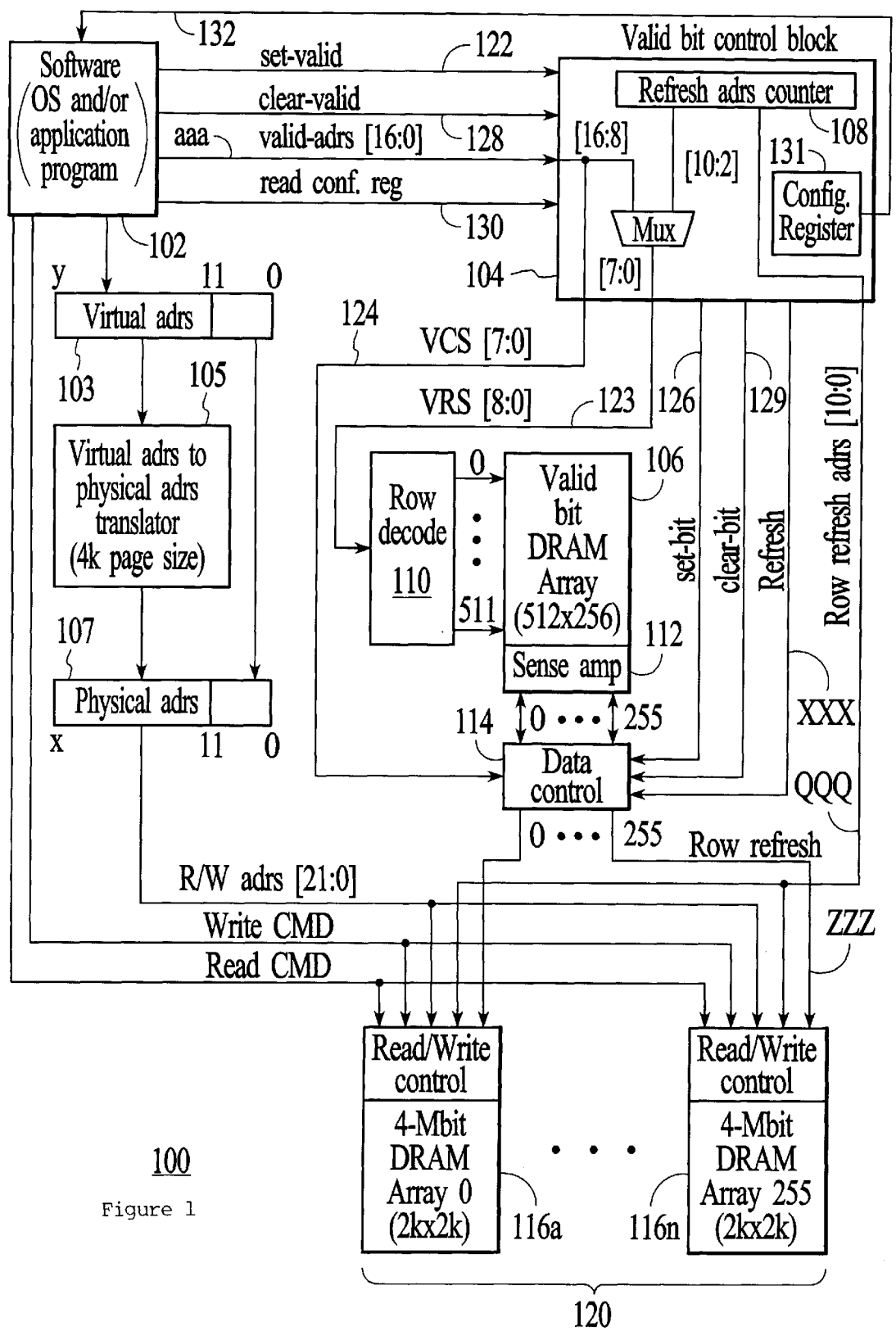
FIG. 1 illustrates an exemplary computer system using a one gigabit (GB) DRAM.

The present invention relates generally to dynamic random access memories (DRAMs) and more particularly to reducing power consumption when utilizing such a memory. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A system and method in accordance with the present invention allows for software control of a DRAM refresh to reduce power consumption in a data processing system. A plurality of mechanisms in a computer system are needed allow a software program to control DRAM refresh.

A plurality of valid bits are provided, each valid bit allows for a group of DRAM cells to suppress the refresh operation when a refresh is not needed. Each of the valid bits is utilized to control the refresh of all cells in a row of DRAM cells and that all cells of a memory location be contained in one row. A set of commands is utilized to set or clear a valid bit, which allows the software to control the refresh. The plurality of valid bits should be implemented within the DRAM cells. Each of the valid bits is utilized to control many rows of DRAM cells to reduce overhead. Finally, a mechanism must be utilized to allow software to determine how many memory locations are under the control of a particular valid bit. Each of these elements will be discussed in detail hereinbelow.

1) A valid bit for a group of DRAM cells to suppress refresh operation when not needed.

During periodic refresh cycles, if the valid bit is clear for a group of DRAM cells the actual refresh operation is not performed for this group of cells, thereby avoiding unnecessary power consumption.

2) The valid bit controls the refresh of all cells in a row of DRAM cells and that all cells of a memory location be contained in one row.

Since DRAM is organized as an array of rows and columns, with all bits in a row being accessed together for a read, write, or refresh operation, all bits in a row must be under the control of one valid bit. Furthermore, since software generally reads and writes one or more memory locations at a time all cells within a memory location be within one row.

3) A set of commands to set or clear the valid bit, which allows the software to control the refresh.

Existing DRAM designs provide for the system read and write commands, which would not affect the newly introduced valid bit. Two new commands are introduced:

(a) A set-valid command sets the valid bit that is associated with the specified memory location, thereby forcing all DRAM cells under the control of this valid bit to be refreshed. The specified memory location can be any address within the range of addresses that are under the control of the desired valid bit. The system would use this command when a page is assigned to a program.

(b) A clear-valid command clears the valid bit that is associated with the specified memory location, thereby preventing all DRAM cells under the control of this valid bit to be refreshed. The specified memory location can be any address within the range of addresses that are under the control of the desired valid bit. The software would use this command when it knows that the data in all memory locations under the control of the valid bit is no longer needed. Since misuse of this command is detrimental to the system, this command should be made available only to system-mode programs, such as an operating system, as opposed to user-mode programs.

4) All of the valid bits should be implemented using existing DRAM cells but without providing a refresh mechanism Implementing valid bits could add significant overhead to existing DRAM designs, mostly due to the large number valid bits. In a typical DRAM design, one row contains 2048 cells. If one valid bit were assigned to one row of 2048 cells in a 1-gigabit DRAM design, 512K (K being 1024) of valid bits would be needed. To minimize this overhead, the valid bits themselves can be implemented using DRAM cells, as opposed to SRAM cells (that would have required 10–30 times larger area). However, since these valid bits would be read at least once during each refresh period to determine if the associated rows need refresh, these bits would not have to be refreshed at all. Therefore, these valid bits would not need a refresh mechanism, unlike normal DRAM cells.

5) To further reduce the overhead of using a plurality of valid bits, one valid bit controls many rows of DRAM cells.

In fact, since a typical-size page contains many times more bits than in a typical-size row, it is desirable to use one valid bit to control multiple rows. For instance, since a 4K-byte page would occupy 16 rows of 2048 cells, it would require ¼ the overhead for one valid bit to control the refresh of 4 rows than to control one row.

6) A mechanism for the system to know how many memory locations are under the control of one valid bit.

This information is needed for the system to issue the right number of set-valid and clear-valid commands in setting or clearing all of the valid bits that pertain to one particular page. A page must contain number of bits that is some integral multiple of the bits that one valid bit controls. For instance, if a system uses 4K-byte pages and the DRAM subsystem uses one valid bit per 4 rows of 2048 cells, then the system needs to know that a valid bit controls refresh of 1K bytes (4×2048 bits=1024 bytes) so that it can issue 4 set-valid and clear-valid commands per page. There can be many ways to convey this information to the system. This information can be programmed into the software, if the system uses only one configuration (DRAM cells/valid bit) of DRAM. This information can also be kept in a register in the DRAM subsystem such that the software can read the register to issue proper number of commands, allowing the system to use DRAM subsystem of different and/or multiple configurations. Each DRAM chip could employ such configuration register, indicating the number of memory locations whose refresh is controlled by a valid bit. Alternatively, a system could provide one or more configuration registers that can be programmed to indicate the same information if the employed DRAM chips do not employ such a register.

To describe the present invention in the context of a specific example, refer now to the following example. FIG. 1 illustrates an exemplary computer system 100 using a one gigabit (Gb) DRAM 120 employing a configuration register 131. In this embodiment, the one Gb DRAM 120 comprises a plurality of 4 megabit (Mb) memory arrays 116*a*–116*n* (in this example 256 memory arrays), each of the 4-Mbit arrays including 2K rows of 2K bits and the associated read/write control logic. In addition, it is assumed that one valid bit is designed to control four rows, which is indicated in the configuration register 131. So, 256×2K/4=128K valid bits are needed to control 512K rows. Software issues the read-conf-reg command 130 to read the configuration information stored in the configuration register 131. The configuration information indicates the number of memory locations that are under the control of one valid bit. The valid bits are implemented using a DRAM in an array of, for instance, 512 rows of 256 bits.

When the set-valid command 122 is received, along with the valid address aaa that specifies one valid bit, a valid bit control block (104) generates the valid row select (VRS) signal 123 that selects one of 512 rows in the valid bit array that contains the specified valid-adrs 124, generates the valid column select (VCS) signal 124 that selects the specified one of 256 valid bits in the selected row, and generates the set-bit signal 126 to set the specified bit. A similar set of signals is generated when a clear-valid command 128 is received, except that a clear-bit signal 129 is generated to clear the specified valid bit. The valid bit control block 104 selects the upper-most 9 bits of the valid-adrs (16:0) signal as the VRS, using the MUX 109, when changing the valid bits in response to the set-valid or clear-valid command.

The valid bit control block 104 includes a refresh-address counter 108. Using preferably in this embodiment, an 11-bit counter, for instance, the row refresh address signal specifies one of 2K rows. Each of the plurality of memory arrays 116*a*–116*n* uses this address to select one row for a possible refresh operation. The upper-most 9 bits of the counter 108 is used to generate the VRS signal 123 that selects the corresponding row in the valid bit array (the lower 2 bits in the counter 108 is not needed since each valid bit controls refresh of 4 rows). The selected row in the valid bit array 106 contains a plurality of bits (i.e. 256 bits), one for each of the plurality of memory arrays 116*a*–116*n*. If the valid bit is set for a particular memory array, the array refreshes the selected row. If not, the array does not refresh the row. When the valid bit control block 104 generates the refresh xxx and VRS signals, the plurality of valid bits are read from the valid bit array.

The refresh signal xxx is qualified with each of the plurality valid bits to generate a plurality of row refresh signals zzz, one for each memory array. Each memory array 116a–116n uses the row refresh adrs signal qqq to select a row and performs the refresh operation if the corresponding row refresh signal is asserted. This step is repeated for the next address in the refresh-address counter.

Accordingly, a system and method in accordance with the present invention allows for software control of a DRAM refresh to reduce power consumption in a data processing system. In a system and method in accordance with the present invention, a plurality of valid bits are provided, each valid bit allows for a group of DRAM cells to suppress the refresh operation when a refresh is not needed. Each of the valid bits controls the refresh of all cells in a row of DRAM cells and all cells of a memory location are contained in one row. A system and method in accordance with the present invention utilizes a set of commands to set or clear a valid bit, which allows the software to control the refresh. The plurality of valid bits are preferably implemented using the DRAM cells but without providing a refresh mechanism to reduce overhead.

Through the present invention, each of the plurality of valid bits is utilized to control a plurality of rows to further reduce overhead. Finally, a mechanism must be utilized to allow software to determine how many memory locations are under the control of a particular valid bit.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A method of controlling refresh of a plurality dynamic random access memory (DRAM) cells in a data processing system comprising the steps of:
   (a) providing at least one valid bit to control the refresh of at least one row of DRAM cells;
   (b) utilizing a configuration register to indicate the number of memory locations controlled by the at least one valid bit, wherein the number of memory locations determine the number of valid bits that control a page; and
   (c) providing a set of commands by a software program to read the configuration register and to control the at least one valid bit.

2. The method of claim 1 wherein the at least one valid bit is within a DRAM array without having a refresh mechanism.

3. The method of claim 1 wherein the at least one valid bit suppresses the refresh operation when a refresh is not needed.

4. The method of claim 1 wherein the set of commands comprises:
   a read configuration register command;
   a set valid command; and
   a clear valid command.

5. The method of claim 4 wherein the set valid command sets the at least one valid bit.

6. The method of claim 4 wherein the clear valid command clears the at least one valid bit.

7. The method of claim 4 wherein the read configuration register command provides the number of memory locations to be controlled by the at least one valid bit.

8. A data processing system comprising:
   a plurality of dynamic random access memory (DRAM) cells; including at least one valid bit to control the refresh of at least one row of DRAM cells,
   a configuration register for indicating the number of memory locations to be controlled by the at least one valid bit, wherein the number of memory locations determine the number of valid bits that control a page; and
   a software program for providing a set of commands to read the configuration register and to control the at least one valid bit.

9. The data processing system of claim 8 wherein the at least one valid bit is within a DRAM array without having a refresh mechanism.

10. The data processing system of claim 8 wherein the at least one valid bit suppresses the refresh operation when a refresh is not needed.

11. The data processing system of claim 8 wherein the set of commands comprises:
    a read configuration register command;
    a set valid command; and
    a clear valid command.

12. The data processing system of claim 11 wherein the set valid command sets the at least one valid bit.

13. The data processing system of claim 11 wherein the clear valid command clears the at least one valid bit.

14. The data processing system of claim 10 wherein the read configuration register command provides the number of memory locations to be controlled by the at least one valid bit.

15. A system for controlling refresh of a plurality dynamic random access memory (DRAM) cells in a data processing system comprising:
    a plurality of valid bits, each of the valid bits for controlling the refresh of a predetermined number of rows of DRAM cells;
    a configuration register for indicating the number of memory locations to be controlled by each of the valid bits, wherein the number of memory locations determine the number of valid bits that control a page; and
    a software program for providing a set of commands to read the configuration register and to control the plurality of valid bits.

16. The system of claim 15 wherein the plurality of valid bits are within a DRAM array without having a refresh mechanism.

17. The system of claim 15 wherein the each of the plurality of valid bits suppresses the refresh operation when a refresh is not needed.

18. The system of claim 15 wherein the set of commands comprises:
    a read configuration register command;
    a set valid command; and
    a clear valid command.

19. The system of claim 18 wherein the set valid command sets each of the plurality of valid bits.

20. The system of claim 18 wherein the clear valid command clears each of the plurality of valid bits.

21. The system of claim 16 wherein the read configuration register command provides the number of memory locations to be controlled by each of the plurality of valid bits.

22. A configuration register for use in controlling refresh of a plurality of dynamic random access memory cells, the register comprising:

means for indicating a number of memory locations to be controlled by at least one valid bit, wherein the number of memory locations determine the number of valid bits that control a page; and means for receiving a set of commands from a software program, the set of commands allow for reading the configuration register and therein control the at least one valid bit.

23. The register of claim 22 wherein the at least one valid bit is within a DRAM array without having a refresh mechanism.

24. The register of claim 22 wherein the at least one valid bit suppresses the refresh operation when a refresh is not needed.

25. A method for controlling refresh of a plurality dynamic random access memory (DRAM) cells in a data processing system comprising the steps of:

(a) providing the at least one valid bit to control the refresh of at least one row of DRAM cells; wherein the at least one valid bit is within a DRAM array without having a refresh mechanism, wherein the at least one valid bit suppresses the refresh operation when a refresh is not needed;

(b) utilizing a configuration register to indicate the number of memory locations to be controlled by the at least one valid bit, wherein the number of memory locations determine the number of valid bits that control a page; and (c) providing a set of commands by a software program to read the configuration register and to control the at least one valid bit, wherein the set of commands comprises a read configuration register command; a set valid command; and a clear valid command, wherein the set valid command sets the at least one valid bit; wherein the read configuration register command provides the number of memory locations to be controlled by the at least one valid bit; and the clear valid command clears the at least one valid bit.

26. A data processing system comprising:

a plurality of dynamic random access memory (DRAM) cells; including at least one valid bit to control the refresh of at least one row of DRAM cells, wherein the at least one valid bit is within a DRAM array without having a refresh mechanism, wherein the at least one valid bit suppresses the refresh operation when a refresh is not needed;

a configuration register for indicating the number of memory locations to be controlled by the at least one valid bit, wherein the number of memory locations determine the number of valid bits that control a page; and a software program for providing a set of commands to read the configuration register and to control the at least one valid bit, wherein the set of commands comprises a read configuration register command; a set valid command; and a clear valid command, wherein the set valid command sets the at least one valid bit; wherein the read configuration register command provides the number of memory locations to be controlled by the at least one valid bit; and the clear valid command clears the at least one valid bit.

27. A system for controlling refresh of a plurality dynamic random access memory (DRAM) cells in a data processing system comprising:

a plurality of valid bits, each of the valid bits for controlling the refresh of a predetermined number of rows of DRAM cells, wherein the plurality of valid bits are within a DRAM array without having a refresh mechanism, wherein the each of the plurality of valid bits suppresses the refresh operation when a refresh is not needed;

a configuration register for indicating the number of memory locations to be controlled by each of the valid bits, wherein the number of memory locations determine the number of valid bits that control a page; and a software program for providing a set of commands to read the configuration register and to control the plurality of valid bits, wherein the set of commands comprises a read configuration register command; a set valid command; and a clear valid command, wherein the read configuration register command provides the number of memory locations to be controlled by the each of the plurality of valid bits; the set valid command sets each of the plurality of valid bits; and wherein the clear valid command clears each of the plurality of valid bits.

* * * * *